United States Patent
Bonus

(10) Patent No.: US 8,628,060 B2
(45) Date of Patent: Jan. 14, 2014

(54) LIFTING BAG OF WEB-LIKE RUBBER MATERIAL HOT-VULCANIZED IN A PRESS AND METHOD FOR ITS PRODUCTION

(75) Inventor: Egon Bonus, Kall (DE)

(73) Assignee: Vetter GmbH, Zulpich (DE)

( * ) Notice: Subject to any disclaimer, the term of this patent is extended or adjusted under 35 U.S.C. 154(b) by 176 days.

(21) Appl. No.: 12/961,981

(22) Filed: Dec. 7, 2010

(65) Prior Publication Data

US 2011/0133143 A1 Jun. 9, 2011

(30) Foreign Application Priority Data

Dec. 9, 2009 (DE) .......................... 10 2009 047 758

(51) Int. Cl.
*B66F 3/24* (2006.01)
(52) U.S. Cl.
USPC ...................... 254/93 HP; 254/2 B; 254/89 H
(58) Field of Classification Search
USPC .................. 254/93 HP, 93 L, 2 B, 89 H, 89 R
See application file for complete search history.

(56) References Cited

U.S. PATENT DOCUMENTS

| | | | |
|---|---|---|---|
| 4,036,472 A * | 7/1977 | Orndorff, Jr. ............. | 254/93 HP |
| 4,079,915 A * | 3/1978 | Mountain ................. | 254/93 HP |
| 4,143,854 A | 3/1979 | Vetter | |
| 4,560,145 A * | 12/1985 | Widmer .................... | 254/93 HP |
| 4,643,398 A | 2/1987 | Vetter | |
| 4,948,107 A * | 8/1990 | Orndorff, Jr. ............. | 254/93 HP |
| 5,492,300 A * | 2/1996 | Riihiluoma et al. ....... | 248/354.1 |
| 6,092,788 A * | 7/2000 | Simon ....................... | 254/93 HP |
| 8,215,615 B2 * | 7/2012 | Niklasson ................. | 254/93 HP |
| 2008/0149905 A1 * | 6/2008 | Fernandez ................ | 254/93 HP |
| 2008/0210917 A1 * | 9/2008 | Niklasson ................. | 254/93 HP |
| 2011/0133143 A1 * | 6/2011 | Bonus ....................... | 254/93 HP |

FOREIGN PATENT DOCUMENTS

| | | |
|---|---|---|
| EP | 0040578 | 11/1981 |
| FR | 2305381 | 10/1976 |

* cited by examiner

*Primary Examiner* — Lee D Wilson
(74) *Attorney, Agent, or Firm* — McCarter & English, LLP

(57) ABSTRACT

The lifting bag comprises an inside bladder (20) having a nipple (22), and a shell (24) of reinforced rubber material located outside of the inside bladder (20) and closely enclosing the inside bladder (20). The shell (24) comprises a passage for the nipple (22). The inside bladder (20) is produced in a first vulcanizing step; the shell (24) is added and is produced in a subsequent second vulcanizing step. A separating material (26) is located between the shell (24) and the inside bladder (20); the shell (24) is not connected with the inside bladder (20). A method for producing such a lifting bag is provided.

14 Claims, 2 Drawing Sheets

LIFTING BAG OF WEB-LIKE RUBBER MATERIAL HOT-VULCANIZED IN A PRESS AND METHOD FOR ITS PRODUCTION

CROSS-REFERENCE TO RELATED APPLICATIONS

This patent application claims priority to co-pending German Patent Application No. DE 10 2009 047 758.6, filed on Dec. 9, 2009 which is hereby expressly incorporated by reference in its entity as part of the present disclosure.

BACKGROUND OF THE INVENTION

The invention relates to a lifting bag of web-like rubber material hot-vulcanized in a press, said bag comprising an inside bladder which has a nipple via which an interior of the bladder is accessible, and a shell of reinforced rubber material located outside of the bladder and closely enclosing the bladder; the shell comprises a passage for the nipple.

BRIEF DESCRIPTION OF RELATED ART

Such a lifting bag is known, for example, from U.S. Pat. No. 4,643,398. In this lifting bag, the bladder and shell are firmly connected with each other; the lifting bag is produced in a single hot-vulcanizing step.

Furthermore, the invention relates to a method for producing such a lifting bag; in the previously known lifting bag according to U.S. Pat. No. 4,643,398 production takes place in a single process step by means of vulcanization in a press.

With regard to the prior art, reference is also made to EP 40578 A1; U.S. Pat. No. 4,036,472; U.S. Pat. No. 4,143,854 and FR 2 305 381. Important technical terms, manufacturing processes, materials, areas of use and the structure of a lifting bag of the type concerned here are known from these documents and from the document mentioned in the introduction. These documents are incorporated into the present method at least in that regard.

According to the prior art, the pre-cut parts for the bladder and the parts of the shell are compiled and inserted into the press in order to produce the lifting bag. The overlapping areas of the bladder and of the parts of the shell only connect to form an airtight ensemble during the hot-vulcanizing process. As is apparent, in particular, from EP 1 579 47 B1, care must be exercised during the production process that the connection is effected over the entire surface of the bag and that, in particular, pockets or bubbles of air do not form between the bladder or the parts of the shell.

BRIEF SUMMARY OF THE INVENTION

In practical operation, the lifting bag is subjected to heavy stresses. It is usually filled with air in the range of, for example, 8 bar. In the process, high tensions occur in the wall of the bag. This leads to considerable stresses. According to experience, the bursting pressure of the lifting bag decreases more and more as the number of load changes between the completely inflated state and the deflated state increases. A lifting bag of the type concerned herein should be capable of withstanding at least 20,000 lifts. In this case, the bursting pressure is about 49 bar. It was found, in extended test runs with an inflation of the lifting bag to a testing pressure and subsequent deflation, that defects, inner tears, separation planes and other irregularities occur in the walls of the lifting bag. Inner damage that is not recognizable from the outside can be detected which is caused by the different components of the walls of the lifting bag being stretched heavily. In the case of tests, a lifting bag is subjected to heavy stress in particular by being inflated freely; the wall is stretched particularly heavily in this case. However, if the lifting bag is inflated in practical deployment, for example in a gap in a wall, the stretch is not quite as considerable.

The rubber material is usually not vulcanized prior to the vulcanizing step; as a rule, it is unvulcanized. Other materials that can be connected in a press, in particular vulcanized, can also be used instead of rubber materials. Originally, the rubber material is available in the form of webs. Reinforcing materials, in particular fabrics as they are common also in the tire-manufacturing industry, are used for reinforcing the rubber material. Steel cord, Kevlar or other plastic fibers such as aramid, for example, are used, as are carbon fibers etc.

If the bursting pressure becomes gradually lower after several test cycles or deployments, a critical threshold is reached at some point in time. If it has been reached in a specific lifting bag cannot be established from the outside without using special detecting devices. If the bursting pressure has dropped severely, the lifting bag may burst during normal deployment. This may lead to serious accidents. Therefore, there are efforts to produce a lifting bag which still has a high bursting pressure, in particular maintains the original bursting pressure, even after a high number of filling and deflating processes. There is the demand for a lifting bag whose walls are more resistant against the great stresses during inflating and deflating pressurized air than is the case in the lifting bag according to the prior art, as well as for a corresponding production method.

Based thereon, it is the object of the invention to develop the lifting bag of the type mentioned in the introduction in such a way that it better withstands the great stresses of repeated filling and deflating processes, that it thus has a longer life span, that its walls are configured to be more stable, and to specify a corresponding method for the production of such a lifting bag.

This object is achieved by a lifting bag of web-like rubber material hot-vulcanized in a press, said bag comprising an inside bladder which has a nipple via which an interior of the bladder is accessible, and a shell of reinforced rubber material located outside of the bladder and closely enclosing the bladder, wherein the shell comprises a passage for the nipple, the bladder is produced in a first vulcanizing step, the shell is added and produced in a subsequent second vulcanizing step, a separating means is located between the shell and the bladder, the shell is not connected with the bladder.

In contrast to the prior art, this lifting bag is produced in two separate steps of a vulcanizing process, one after the other, in a press or two different presses. In the lifting bag according to the invention, the bladder does not have any connection, in particular flat connection, with the shell. At most, the bladder and shell are connected in the area of the nipple or in a small area around the nipple, which extends in particular over a distance of maximally 3 to 5 cm from the nipple. In the lifting bag according to the invention, the bladder has a substantially constant material thickness. This cannot be accomplished in a lifting bag according to the prior art because in that case, the bladder directly merges into the shell and the material thickness of the bladder is not constant everywhere. The bladder can be optimally configured for the requirements of the lifting bag in the lifting bag according to the invention. Preferably, it is not reinforced. It can stretch considerably more easily than the shell. This is accomplished in particular by its expandability being at least three times, at least five times as great as the expandability of the shell.

The shell contacts the bladder closely, but does not have any connection with it. A close contact is supposed to mean a substantially flat-surface contact of the entire surface, at least over 80% of the surface of the bladder; a contact over at least 50% of the bladder is also sufficient. In the lifting bag according to the invention, the bladder may be displaced relative to the shell when the bladder is inflated. Tensions as they can occur in the lifting bag according to the prior art are thus relieved.

A liquid and/or solid means is used as the separating means. For example, a foil is wrapped around the bladder before pre-cut parts for producing the shell are attached or wound around the bladder. The separating means is supposed to ensure that, in the second vulcanizing step, the shell cannot somehow connect to the bladder already produced. Such separating means are known to persons skilled in the art from the field of rubber engineering. The separating means can also have lubricating properties. Irrespective of this, it can be advantageous to introduce a lubricant between the bladder and the pre-cut parts for the shell so that a relative movement between the shell and the bladder is promoted. Such lubricants which can withstand the vulcanization temperatures are known to the person skilled in the art from the tire-manufacturing industry.

The invention in particular addresses the person skilled in the art with knowledge of the tire-manufacturing industry, because this person skilled in the art knows the manufacturing process of embedding reinforcing threads into motor vehicle tires, and is able to perform similar steps also in the case of lifting bags according to the invention. In this respect, there is a correspondence with an automobile tire with a separate tube, with the separate tube forming the bladder and the tire forming the shell. Therefore, the function of providing tightness is assigned exclusively to the bladder, the function of providing a high bursting pressure is assigned to the shell.

In a preferable embodiment, the lifting bag has a rectangular shape. In this case, the nipple is preferably disposed in a corner and on a diagonal line. The arrangement of the nipple in a corner has proved beneficial because the corners deform relatively little during inflation. However, it is also possible to dispose the nipple in the center of a wall or in the area of its edge. The latter arrangement is demanded in particular by users that use the lifting bag for forming processes, for example in a mold.

In a preferred development, the shell is not completely airtight. In other words, the shell has at least one small leak. In this way, the space between the shell and the bladder is not sealed in an airtight manner. It is thus possible to keep the bag very flat in the deflated state. Possible air pockets between the bladder and the shell escape during deflation and/or inflation to nominal pressure.

In the known manner, the bladder preferably does not have any reinforcement. It is possible to equip the bladder with a certain reinforcement. However, this is supposed to be selected such that the bladder can be stretched three times more easily than the shell.

Preferably, the shell is formed from two layers which have different reinforcement directions. In this case, a shell structure can be adopted which is known from EP 157947 B1.

In the method according to the invention, a complete and usable bladder is produced first. The production of the bladder may take place at location different from that of the completion of the bag. Thus, the bladder can be a purchased part. It has a wall thickness of 0.5 to 5 mm, the wall thickness being adapted to the respective intended purpose. The bladder is usually produced from pre-cut parts of web-like, non-vulcanized rubber material; in this regard, there is no difference to the production of the bladder of the lifting bag in the prior art.

Prior to the second vulcanizing step, the bladder is enveloped with a separating means. Subsequently, pre-cut parts for an inner and then for an outer layer are wrapped closely around the bladder. In this step, attention is paid that no air pockets remain between the bladder and the pre-cut parts, at least no considerable air pockets. The pre-cut parts are wrapped around the bladder so as to contact the bladder in a flat manner everywhere, if possible. This especially applies to an inner layer. An outer layer is also applied so that its inner surface adjoins everywhere, substantially against the inner layer and also against the surface of the bladder not yet covered. A passage for the nipple is provided in the shell. Preferably, the shell is connected to the bladder at the nipple and/or in the immediate vicinity of the nipple. It is connected only there. It is thus ensured that the nipple cannot move relative to the shell. Preferably, the material of the shell is vulcanized onto the nipple. Also in this case, a method is used as it is already employed in the previously known lifting bag. The nipple is usually made from metal; a rubber-metal connection according to the prior art is produced. Instead of a hot-vulcanization process, a different vulcanization process may also take place, for example cold vulcanization. The shell is preferably twice as thick as the bladder. Preferably, the material thickness of the shell and/or the bladder is constant, and changes at most by the factor 1.5, maximally 3.

BRIEF DESCRIPTION DRAWINGS

Other advantages and features of the invention become apparent from the other claims as well as from the following description of an exemplary embodiment of the invention, which shall be understood not to be limiting and which will be explained below with reference to the drawing. In the drawings:

DETAILED DESCRIPTION OF THE INVENTION

Figure 1:
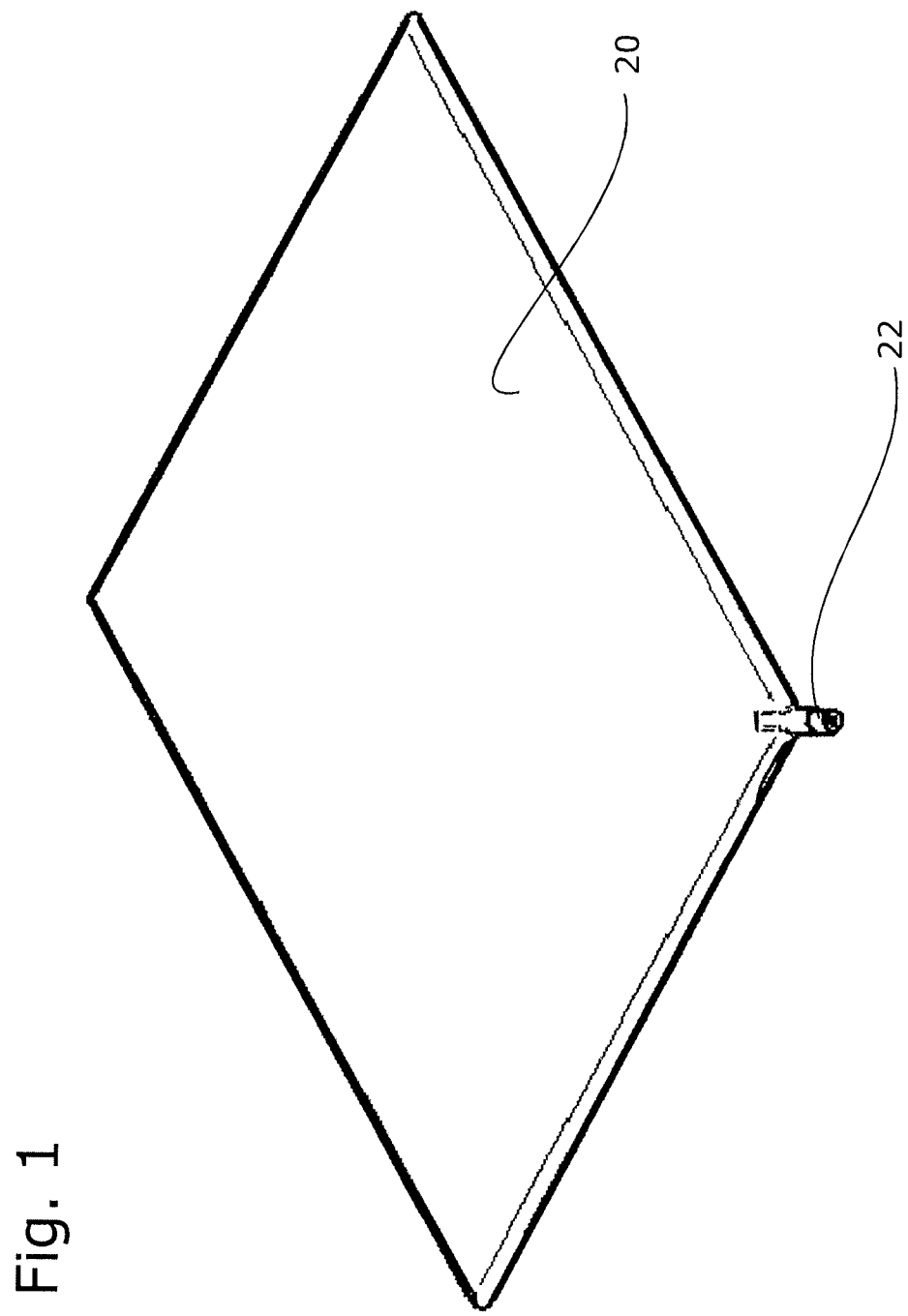
FIG. 1 shows a perspective view of a bladder.

A bladder 20 is made from natural rubber, it substantially consists of two panels of equal size, which are rectangular and rest directly one atop the other, and which merge into each other at the edges. The wall thickness of the bladder is as constant as possible; it is 3 to 3.5 mm. The bladder 20 is produced in a first hot-vulcanizing step in a first mold. Rubber materials other than natural rubber are possible, for example polymerisates from conjugated dienes, copolymerisates from conjugated dienes and vinyl derivatives. Structurally analogous synthetic rubbers are also understood to be natural rubbers. The starting materials also used in the case of the lifting bag according to the prior art for the production of the bladder are used for the production of the bladder 20 as shown in FIG. 1. In this respect, reference is made to the prior publications mentioned in the introduction; they are incorporated into the present application with regard to their entire content.

As in the prior art, the bladder 20 is produced from raw rubber material provided in the form of a web, which is pre-cut accordingly. Preferably, only one pre-cut part is used; however, several pre-cut parts can also be used for the production of the bladder 20. The one pre-cut part forms the two connected panels and at the same time overlapping areas in three marginal areas in which the material is folded, starting from the one panel, in the plane of the other panel and onto the other panel and overlaps with this other panel. The starting material has a material thickness of about 3 to 3.5 mm. A preferably constant wall thickness is achieved by the first vulcanizing step; the vulcanizing step is carried out such that the material from the overlapping areas is able to spread homogeneously everywhere. The vulcanizing step is carried out in the known manner in the first mold which also determines the external shape of the bladder 20.

Figure 2:
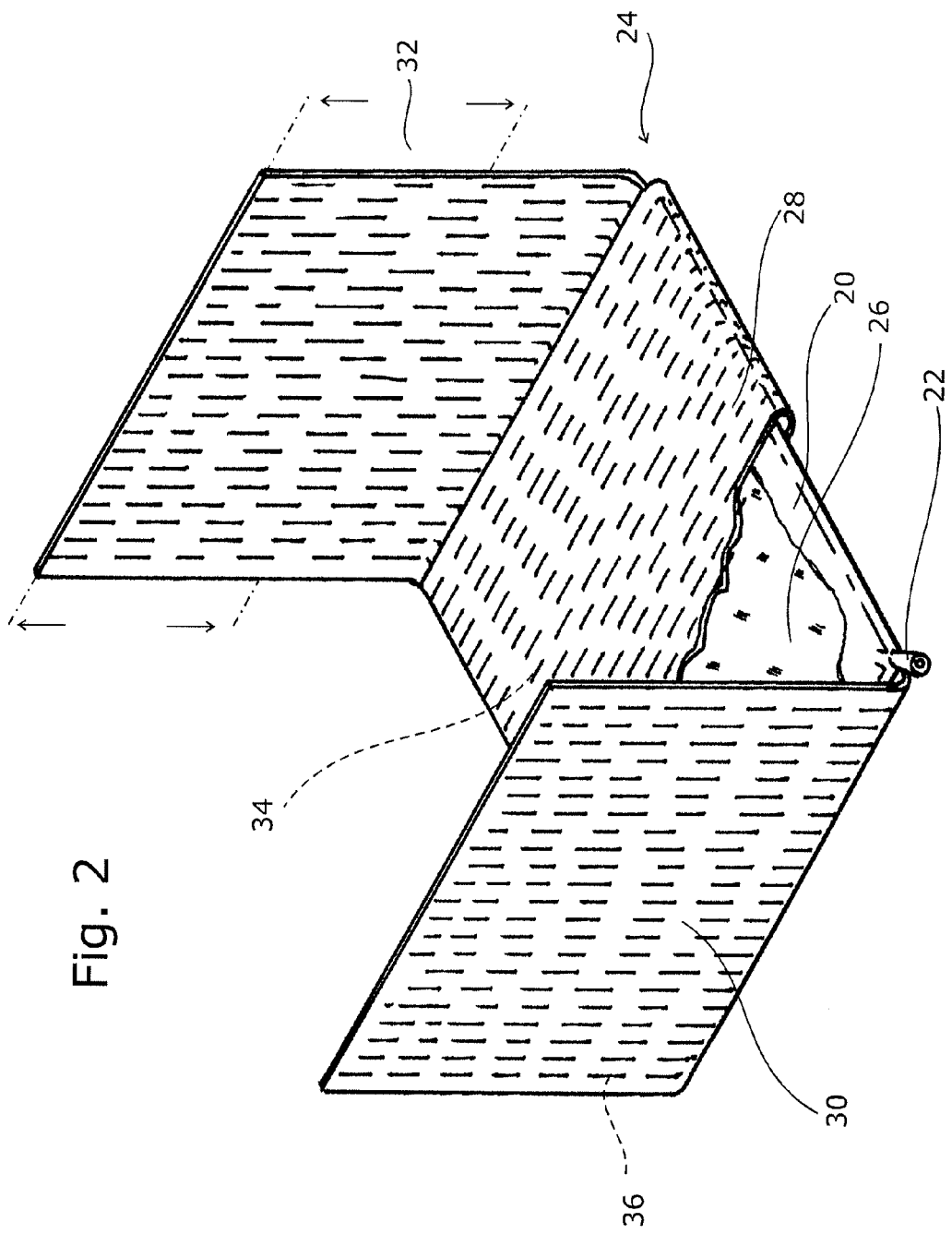
FIG. 2 shows a perspective view of the bladder according to FIG. 1, which is not yet completely enclosed by a shell; the shell is not completely closed, the second vulcanizing step has not been executed yet.

The bladder 20 is provided with a nipple 22 in the known manner, the latter is disposed in a corner area. The interior of the bladder 20 can only be accessed through it. The nipple 22 comprises an external thread, for example. The arrangement in a corner has proved to be beneficial because the corners deform the least during inflation. However, it is also possible to dispose the nipple 22 in a panel and make it extend perpendicularly to it. In FIGS. 1 and 2, the nipple 22 protrudes outwardly in the direction of a diagonal of the rectangular bladder 22 and projects at least a few millimeters, at most a few centimeters, for example 3 to 7 cm.

The bladder 20 could already be used as a lifting bag by itself. It is not reinforced. Therefore, there is the risk of it bursting if it is allowed to expand unlimitedly in one area during use. The bladder 20 can be compared to a tube of a tire equipped with tube for an automobile. Only the wall thickness is greater than in the case of a tube of an automobile tire.

The bladder 20 can be produced in a similar way as a hot-water bottle as it is currently being used in practice.

FIG. 2 shows how the bladder 20 is sheathed step by step with a shell 24 prior to a second hot-vulcanizing step which takes place in a second mold. For this purpose, a separating means 26 in the form of a thin sheet, a liquid or also in another form, e.g. as a powder or paste, is applied to the bladder 20. Means as they are also known from the tire-manufacturing industry for motor vehicles are used. One known separating means is, for example, talcum. At the same time, this is advantageous in that it is also a lubricant between adjacent layers.

The shell 24 is prevented from being able to connect to the bladder 20 by means of the separating means 26. The shell 24 and the bladder 20 are connected solely in the area of the nipple. The nipple 22 is also connected to the shell 24, specifically with a corner of the shell 24. It is connected only there. Here, a connection takes place in the second vulcanizing step. In particular, this connection takes place in an annular area around the nipple 22 or adjacent to the nipple 22 in the area of the bladder 20. The connection extends over an annular surface. Axially, it has a length of some millimeters to preferably only 2 cm. It is thus prevented that the nipple 22 can be pressed into the shell 24.

After the separating means 26 has been applied onto all surfaces of the bladder 20, with the exception of the short annular area in the vicinity of the nipple 22 or the nipple 22 itself, an inner layer 28 is first applied as the first layer. Because the bladder 20 in the embodiment shown is rectangular, the inner layer 28 is made from a pre-cut part that is also rectangular. Substantially, it has the following dimensions: Its width corresponds to the length of the bladder; its length is larger by a projecting portion than the double width of the bladder 20. The projecting portion causes the end portions of the inner layer 28 of the folded pre-cut part to overlap, for example overlap over 5 to 20 cm, preferably 12 to 18 cm, and in particular 14 cm. In the case of the inner layer 28 according to FIG. 1, this overlapping portion lies on the underside of the bladder 20, it is invisible in FIG. 1.

An outer layer 30, which also closely envelops the bladder 20 and also the inner layer 28 and extends over it, is now wrapped around the inner layer 28. A pre-cut part having a rectangular shape is also used for the outer layer 30. It has a width corresponding to the width of the bladder 20 with an added portion of about 1 to 5 cm for the inner layer 28, and has a length corresponding to the double length of the bladder 20 plus at least 10 cm, preferably up to 25 cm. Thus, a fold-over portion 32 with a length of several centimeters is obtained, preferably a fold-over portion 32 of about 14 cm, which later leads to an overlap of the two end portions of the pre-cut part on the top side of the bladder 20. The overlap of the outer layer 30 is on the other side of the bladder 20 from the overlap of the inner layer 28. The fold-over portion 32 of the outer layer 30 marked in FIG. 2.

A web-like reinforced rubber material, for example of natural rubber, is used for the pre-cut parts of the inner layer 28 and the outer layer 30. Chloroprene rubber, which is called CR, can be used for the outer layer 30. It has the advantage of being oil-resistant. Other rubber materials can be used depending on the intended use of the lifting bag. Reinforcement is realized by means of reinforcement threads 34, 36. The reinforcement threads 34, 36 respectively extend in the longitudinal direction of the pre-cut part. 34 denotes the reinforcement threads of the inner layer 28, 36 denotes the reinforcement threads of the outer layer 30. In the case of the rectangular lifting bag shown, the reinforcement threads 34, 36 intersect at an angle of 90° degrees. A reinforcement fabric is used in the known manner. In this case, the reinforcement threads 34, 36 constitute the warp threads, arbitrary simple threads, for example of cotton or a cotton-plastic mixture are used as weft threads. The latter threads only have the purpose of keeping the reinforcement threads 34, 36 parallel, and are superfluous in the finished lifting bag.

The common materials as they are also used according to the prior art for lifting bags are used as reinforcing materials. Reinforcement threads 34, 36 from steel cord, other inorganic material or plastic threads are possible. What is critical is the tear strength of the reinforcement threads 34, 36. There are similar problems in the case of motor vehicle tires, and the person skilled in the art will be able to obtain and find reliable information on this, for example with regard to radial tires.

The exclusive purpose of the shell 24 is to permit a certain predetermined expansion of the lifting bag. The shell 24 limits the expansion of the bladder 20 during inflation. The bursting pressure is determined by the shell 24. The tightness of the lifting bag is determined by the bladder 20.

The layers 28, 30 adjoin each other and the bladder 20, respectively, as closely as possible. The bladder 20 is the sealing body. The shell 24 is the reinforcement carrier. Empirically, the bladder 20 lasts until the reinforcement carrier 24 ruptures. The bladder 20 is not the weak point anymore, as in the prior art. It was found in tests that the bursting pressure of the finished lifting bag now does not decrease gradually anymore as the number of inflation and deflation processes increases, but remains at the original value even after e.g. 20,000 lifts.

The space between the bladder 20 and the shell 24 is as small as possible. In the finished lifting bag, the inner layer 28, with its inner surface, directly contacts the outside of the bladder 20, with the separating means 26 disposed therebetween, the separating means 26 being extremely flat; it has a material thickness of less than a millimeter, preferably less than $1/10$ mm. In the edges and corners, the layers 28 or 30 surround the shell 24 closely, so that there are virtually no air pockets between the shell 24 and the bladder 20. The air volume between the shell 24 and the bladder 20 is less than 1%, preferably less than 0.1%, in particular less than 0.01% of the filling volume of the lifting bag.

The shell 24 is tight towards the outside. Thus, the space between the bladder 20 and the shell 24 is continuously in contact with the environment. It cannot occur, in particular during a deflation process, that an air cushion remains between the shell 24 and the bladder 20. Any air entrapped there escapes through a controlled leak which is provided, for example, in a corner of the shell 24 that is not equipped with a nipple 22. In another embodiment, such a leak is omitted because the shell 24 cannot be produced to be completely airtight anyway.

The two layers 28, 30 are directly connected with each other by means of the second hot-vulcanizing step so that they form a single unit. The second mold in which the second vulcanizing step takes place determines the external shape of the finished lifting bag. The second hot-vulcanizing step is carried out so that the material of the pre-cut parts of the two layers becomes liquid and that a thickness of the shell 24 that is as uniform as possible is provided in all areas of this shell 24. Then, the overlapping portions are not visible anymore. The temperature at which the second hot-vulcanizing step is carried out is at least 10° C. less than that of the first hot-vulcanizing step.

What is claimed is:

1. A lifting bag made of a previously web-type rubber material hot-vulcanized in a press, the lifting bag comprising:
    an inside bladder which has a nipple and an interior of the inside bladder, wherein the interior is accessible from the outside via the nipple,
    a shell of reinforced rubber material located outside of the inside bladder and closely enclosing the inside bladder, the shell comprising a passage for the nipple, and
    a separating means located in a space between the shell and the inside bladder, wherein the shell is not fixed to the inside bladder.
2. The lifting bag according to claim 1, wherein the inside bladder is rectangular.
3. The lifting bag according to claim 1, wherein the shell comprises at least one leak, and the space between the shell and the inside bladder is not sealed in an airtight manner towards the outside.
4. The lifting bag according to claim 1, wherein the inside bladder has a corner, and the nipple is disposed in the corner of the inside bladder.
5. The lifting bag according to claim 1, wherein the inside bladder has a total surface, the nipple is connected with the shell only in a local area, the local area has a surface that is at least 20 times or 50 times smaller than the total surface.
6. The lifting bag according to claim 1, wherein the shell is connected with the inside bladder only in a vicinity of the nipple.
7. The lifting bag according to claim 1, wherein the inside bladder, under the same tensile force, expands at least 1.5 times as much as the shell.
8. The lifting bag according to claim 1, wherein the inside bladder, under the same tensile force, expands at least three times as much as the shell.
9. The lifting bag according to claim 1, wherein the inside bladder, under the same tensile force, expands at least 5 times as much as the shell.
10. The lifting bag according to claim 1, wherein the inside bladder has no reinforcement.
11. The lifting bag according to claim 1, wherein a lubricant is provided and is arranged between the inside bladder and the shell.
12. The lifting bag according to claim 11, wherein the lubricant is talcum.
13. The lifting bag according to claim 1, wherein the shell comprises an inner layer and an outer layer, the inner layer and the outer layer each comprise reinforcement threads, the reinforcement threads respectively extend in a single direction, and the reinforcement threads of the inner layer and the outer layer intersect.
14. The lifting bag according to claim 13, wherein the reinforcement threads of the inner layer and the outer layer intersect in an angle of 90° relative to each other.

\* \* \* \* \*